United States Patent [19]
Roberts

[11] Patent Number: 5,723,181
[45] Date of Patent: Mar. 3, 1998

[54] COLLOIDAL SILICA/ZIRCONYL SALT COMPOSITIONS AS HYDROPHILIZING COATINGS

[75] Inventor: William Owen Roberts, Wilmington, Del.

[73] Assignee: E. I. du Pont de Nemours and Company, Wilmington, Del.

[21] Appl. No.: 711,335

[22] Filed: Sep. 6, 1996

[51] Int. Cl.$^6$ ......................................... B05D 3/00
[52] U.S. Cl. ...................... 427/353; 427/354; 427/397.7; 106/600; 501/102; 501/106
[58] Field of Search ........................ 106/600; 501/102, 501/106; 427/353, 354, 397.7

[56] References Cited

U.S. PATENT DOCUMENTS

| | | | |
|---|---|---|---|
| 4,462,842 | 7/1984 | Uchiyama | 148/6.15 R |
| 4,564,556 | 1/1986 | Lange | 428/325 |
| 4,931,414 | 6/1990 | Wood et al. | 501/103 |
| 5,032,556 | 7/1991 | Mori et al. | 501/106 |

OTHER PUBLICATIONS

Du Pont Company—Properties, Uses, Storage, And Handling—Ludox Colloidal Silica;Product Information Booklet; 9/95.

*Primary Examiner*—Benjamin Utech

[57] ABSTRACT

Hydrophilizing compositions based on aqueous colloidal silica and zirconyl salts and a process for rendering surfaces hydrophilic with such compositions are provided.

8 Claims, No Drawings

COLLOIDAL SILICA/ZIRCONYL SALT COMPOSITIONS AS HYDROPHILIZING COATINGS

FIELD OF THE INVENTION

The present invention relates to hydrophilizing compositions based on aqueous colloidal silica in combination with zirconyl salts, and, also, to their application to hydrophobic surfaces to render the surfaces hydrophilic.

BACKGROUND OF THE INVENTION

Numerous applications exist requiring articles having a hydrophilic surface. When articles have hydrophobic surfaces, it is often desirable to impart hydrophilic surface properties by appropriate treatment. There exist many hydrophilizing surface treatments but, in practical applications, these surfaces are often not permanent and can be removed by washing with water.

Neither aqueous colloidal silica alone, nor aqueous zirconyl salt solutions alone impart hydrophilicity to hydrophobic surfaces. Aqueous compositions based on colloidal silica, surfactant and a binder which promotes the binding of the silica to the surface are known to render a hydrophobic surface hydrophilic. Such coatings, however, are readily washed off the hydrophobic surface and thus have limited value.

U.S. Pat. No. 4,462,842 to Uchiyama et al., issued Jul. 31, 1984, discloses a process for imparting hydrophilic properties to aluminum articles in a two-stage treatment. In the first step, a chemical coating, which acts as an undercoating to the subsequent hydrophilic layer, is formed on the surface of the aluminum article using either an acid solution or deionized water or a zirconium fluoride solution. In the second step, either silicic acid or silicate or colloidal silica is used to form a hydrophilic layer over the coating formed in the first step.

There is a need to render hydrophilic normally hydrophobic surfaces, for example, synthetic fibers such as polyethylene terephthalate, and apparels made therefrom, to wick water away from the body; hydrophobic synthetic films, such as polyester and polyolefin films, to permit wetting of the film and hydrophobic wax surfaces in investment casting uses to achieve adhesion of the mold binder composition to the wax pattern.

SUMMARY OF THE INVENTION

The hydrophilizing composition of this invention is based on aqueous colloidal silica and a zirconyl salt and has a pH $\leq$ 5.5.

The process of this invention for rendering the surface of a substrate hydrophilic comprises the steps of applying to a substrate which has oxygen atoms present in the surface molecules of the substrate a hydrophilizing composition based on aqueous colloidal silica and a zirconyl salt followed by optional rinsing and drying.

The article of manufacture of this invention is a substrate having a hydrophilic surface wherein the surface is a (dried) composition based on aqueous colloidal silica and a zirconyl salt.

DETAILED DESCRIPTION OF THE INVENTION

The composition of the present invention can readily wet hydrophobic surfaces but, unlike surfactant-water mixtures, changes the nature of the surface. When rinsed with copious quantities of water the originally hydrophobic surface retains its newly acquired hydrophilicity.

The hydrophilizing composition of this invention is based on aqueous colloidal silica and a zirconyl salt. Any commercially available aqueous colloidal silica can be used in the composition of the present invention. Preferred are Ludox® colloidal silicas (a registered trademark of E. I. du Pont de Nemours and Company). These have an average particle size of 7 to 22 nanometers (nm), a silica content of 25–50% by weight, and are described in a bulletin on Ludox silicas, "Properties, Uses, Storage and Handling", dated September, 1995.

Any zirconium compound that is or can be converted to a zirconyl salt can be used. Preferred compounds are zirconyl chloride and zirconyl acetate because they readily dissolve in water and are readily available.

When these aqueous silica/zirconium compositions are applied to hydrophobic substrates, such as wax and synthetic polymers, an oxide reaction product can bond to the surface and render it hydrophilic. The surface remains hydrophilic after drying, even after repeated water rinsing, before or after drying the aqueous coating composition. The surface, surprisingly, remains hydrophilic indefinitely.

It is believed, that the starting components of the hydrophilizing composition, the aqueous colloidal silica and the zirconyl salt, react with each other to form a mixed oxide containing a Si—O—Zr linkage(s) and that this oxide reaction product, in turn, interacts with the surface of the substrate to form a hydrophilic surface coating bonded to the substrate.

It is further believed, that oxygen present on the substrate surface plays a role in the bonding because substrates having oxygen in the surface molecules, such as polyesters, surface-modified polyolefins, certain waxes and glass can be rendered hydrophilic by the process of this invention.

The compositions of this invention are useful virtually throughout the entire range of silica: zirconyl salt ratios, but both components must be present. The compositions comprise about 5–95% colloidal silica and about 95–5% of zirconyl salt based on the total calculated weight of silica and zirconia. Preferred compositions contain not more than 70% colloidal silica (calculated as $SiO_2$) and not less than 30% zirconyl salt, calculated as $ZrO_2$.

In some applications it is desirable to add a surfactant to the hydrophilizing composition of this invention to speed the formation of a hydrophilic surface. Anionic and nonionic surfactants are preferred; cationic surfactants can be utilized but, sometimes, can cause coagulation. Typical preferred surfactants are "Supralate" WN sodium octyl/decyl sulfate and "Supralate" SP sodium octyl sulfate (trademark of Witco Corporation).

Aqueous colloidal silicas are usually alkaline as available commercially. Because the hydrophilizing composition must have a pH of $\leq 5.5$, it can be prepared, e.g., by first either acidifying or deionizing colloidal silica to lower its pH below about 8.5 and preferably below 7.5. Deionization can be effected by the use of an ion exchange resin, dialysis, or electro-dialysis. The silica can then be added, with agitation, to an aqueous solution of the zirconyl salt. If desired, small amounts of a surfactant can be added, preferably pre-diluted in water.

The compositions of this invention can be applied to hydrophobic substrate surfaces by wiping the surface with or dipping it into the composition. Immersion time of a few seconds to a few minutes is sufficient. Surprisingly, if the treated surface is rinsed with water immediately after treatment, even when the treated area is still completely wet, it still remains hydrophilic. Repeated rinsing and drying does not alter substantially the hydrophilic surface produced by the process of this invention.

EXAMPLES

Example 1

To 420 g of Ludox® SM colloidal silica, having an average particle size of 7 nm and a silica concentration of 30%, was added 20 g of water. Sufficient citric acid was then added, with stirring, to lower the pH to about 7.5. The resulting colloidal silica was added, with stirring, to 283 g of a 20% by weight zirconyl chloride solution (Harshaw Chemical Co.) (calculated as $ZrO_2$).

The resulting hydrophilizing composition was clear and remained stable for over 15 months in an accelerated storage test at 60° C. The composition was calculated to contain about 17.4% $SiO_2$ and about 7.8% zirconyl compound measured as $ZrO_2$. The pH was 0.9.

100 g of the above composition was added to a mixture of 198.5 g of water and 1.5 g of "Supralate" WN sodium octyl/decyl sulfate. This hydrophilizing composition was calculated to contain about 5.7% $SiO_2$, 2.6% $ZrO_2$ and about 0.5% "Supralate" WN. The pH was about 1.3.

A wax test bar, Red Wax C (available from Yates Investment Casting Waxes, Inc. and prepared from paraffin, microcrystalline waxes, an aliphatic hydrocarbon resin, polyethylene and dioctyl adipate) was cleaned by immersing in methyl ethyl ketone (MEK) for about 10 seconds. The cleaned wax bar was then immersed in the hydrophilizing composition for about 10 seconds. After removal from the composition, the wax surface exposed to the composition was uniformly wet. In contrast, when water was applied to cleaned but untreated wax surface, it ran off leaving only a few beads of water.

The wax bar was rinsed in running water immediately after treatment, before the composition had a chance to dry. Surprisingly, the treated area still retained its hydrophilic properties even after rinsing.

The wax bar was then dried and later subjected to water again. The area previously exposed to the composition of this invention retained its hydrophilic surface.

Example 2

To 472 g of Ludox® HS-40 colloidal silica, having an average particle size of 12 nm and containing 40% $SiO_2$, was added 180 g of water and sufficient citric acid to lower the pH to about 7.2.

The resulting colloidal silica was added to 858 g of zirconyl acetate containing about 22% zirconium compound measured as $ZrO_2$. The resulting hydrophilizing composition was calculated to contain 12.5% each of $SiO_2$ and $ZrO_2$ by weight and had a pH of about 3.

100 g of the above composition was added to 200 g of an aqueous solution of 1% "Supralate" SP sodium octyl sulfate. The final composition was calculated to contain about 4.2% each of $SiO_2$ and $ZrO_2$ and 0.67% "Supralate" SP.

A wax bar cleaned as in Example 1 was treated and tested as in Example 1 and identical results were obtained.

Example 3

Wax bars were cleaned with MEK as in Example 1. The wax patterns were partially immersed in a hydrophilizing composition prepared as described in Example 1, and rinsed with water. When the hydrophilic surfaces so formed over the wax patterns were dipped in a ceramic slurry as is generally carried out in investment casting processes, the slurry formed a smooth coating over the treated areas of the pattern. The refractory ceramic slurry was prepared from 1800 g of Ludox® HS-30 colloidal silica (12 nm particle size, 30% $SiO_2$) and 6000 g of 325 mesh Zircon flour ($ZrSiO_4$).

In comparison, when the ceramic slurry was applied to wax bars cleaned with MEK but without the application of the hydrophilizing composition of this invention, the slurry did not wet the patterns on the wax bar and ran off leaving only a few spotty areas covered with slurry thus indicating that the wax surface remained hydrophobic.

Example 4

The experiment of Example 3 was repeated except that 0.2% of sodium di-octyl sulfosuccinate wetting agent was added to the ceramic slurry to promote the wetting of the wax pattern. Upon dipping, the slurry did wet both the treated and untreated areas of the wax pattern and no difference was observed in the uniformity of the refractory coating.

The coated patterns were allowed to dry and a strip of "Scotch" brand Magic Mending tape was placed on the surface of the dried coating so that it passed over both treated and untreated areas of the wax pattern. When the tape was pulled off, the refractory coating over the untreated areas of the pattern was lifted off relatively easily and very little coating remained on the wax. In contrast, the areas treated with the hydrophilizing composition of this invention retained substantially all of the refractory coating.

This experiment illustrates the permanency of the adhesion brought about by utilizing the hydrophilizing composition of this invention, as opposed to merely using a wetting agent to compensate for the hydrophobic nature of the substrate.

Example 5

A hydrophilizing composition prepared as in Example 1 was applied to a sheet of Mylar® polyester film (a registered trademark of E. I. du Pont de Nemours and Company) and then rinsed with water. The water formed a thin, transparent film on the surface of the polyester film. By contrast, untreated film was not wet and water beaded up on the surface.

The treated film was dried and then exposed to a cloud of water vapor and steam. The steam condensing on the treated surface formed a thin, uniform layer and the film remained transparent. When untreated film was tested the same way, water condensed in small, unconnected droplets and the film became opaque.

Example 6

Example 5 was repeated using Tedlar® fluorocarbon film (a registered trademark of E. I. du Pont de Nemours and Company); identical results were obtained.

Example 7

To 472 g of Ludox® HS-40 was added 180 g of water, and sufficient citric acid to adjust the pH to about 7.2. The resulting colloidal silica was added to 858 g of zirconyl acetate containing about 22% zirconium compound measured as $ZrO_2$.

A wax bar was dipped in this hydrophilizing composition and immediately withdrawn. Much of the liquid drained from its surface but a few areas were wetted and remained wetted when rinsed in water.

Wax bars were dipped for progressively longer times and then rinsed. It was found that after immersion for about one minute, the wax bar remained fully wetted when rinsed.

This indicated that while the inclusion of a wetting agent (see Example 2) is not essential, it can significantly increase the rate of reaction at the wax surface.

I claim:

1. A hydrophilizing composition consisting essentially of about 5–95% by weight, calculated as $SiO_2$, of the composition, of aqueous colloidal silica and about 95–5% by weight, calculated as $ZrO_2$, of the composition, of a zirconyl salt, having a pH of $\leq 5.5$.

2. A hydrophilizing composition which is the reaction product of about 5–95% by weight, calculated as $SiO_2$, of the composition, of aqueous colloidal silica and about 95–5% by weight, calculated as $ZrO_2$, of the composition, of a zirconyl salt, having a pH of $\leq 5.5$.

3. The composition of claim 1, additionally containing a surfactant.

4. The composition of claim 2, additionally containing a surfactant.

5. A process for rendering the surface of a substrate hydrophilic comprising the steps of:
    (a) applying to the surface of a substrate a hydrophilizing composition consisting essentially of about 5–95% by weight, calculated as $SiO_2$, of the composition, of aqueous colloidal silica and about 95–5% by weight, calculated as $ZrO_2$, of the composition, of a zirconyl salt, having a pH of $\leq 5.5$, wherein said surface contains oxygen-containing molecules; and
    (b) optionally rinsing the surface and drying.

6. A process for rendering the surface of a substrate hydrophilic comprising the steps of:
    (a) applying to the surface of a substrate a hydrophilizing composition which is the reaction product of about 5–95% by weight, calculated as $SiO_2$, of the composition, of aqueous colloidal silica and about 95–5% by weight, calculated as $ZrO_2$, of the composition, of a zirconyl salt, having a pH of $\leq 5.5$; and
    (b) optionally rinsing the surface and drying.

7. The process of claim 5 wherein the hydrophilizing composition also contains a surfactant.

8. The process of claim 6 wherein the hydrophilizing composition also contains a surfactant.

* * * * *